(No Model.)  F. W. & A. G. HOEFER.  6 Sheets—Sheet 4.
SPRING COILING MACHINE.
No. 598,094. Patented Feb. 1, 1898.
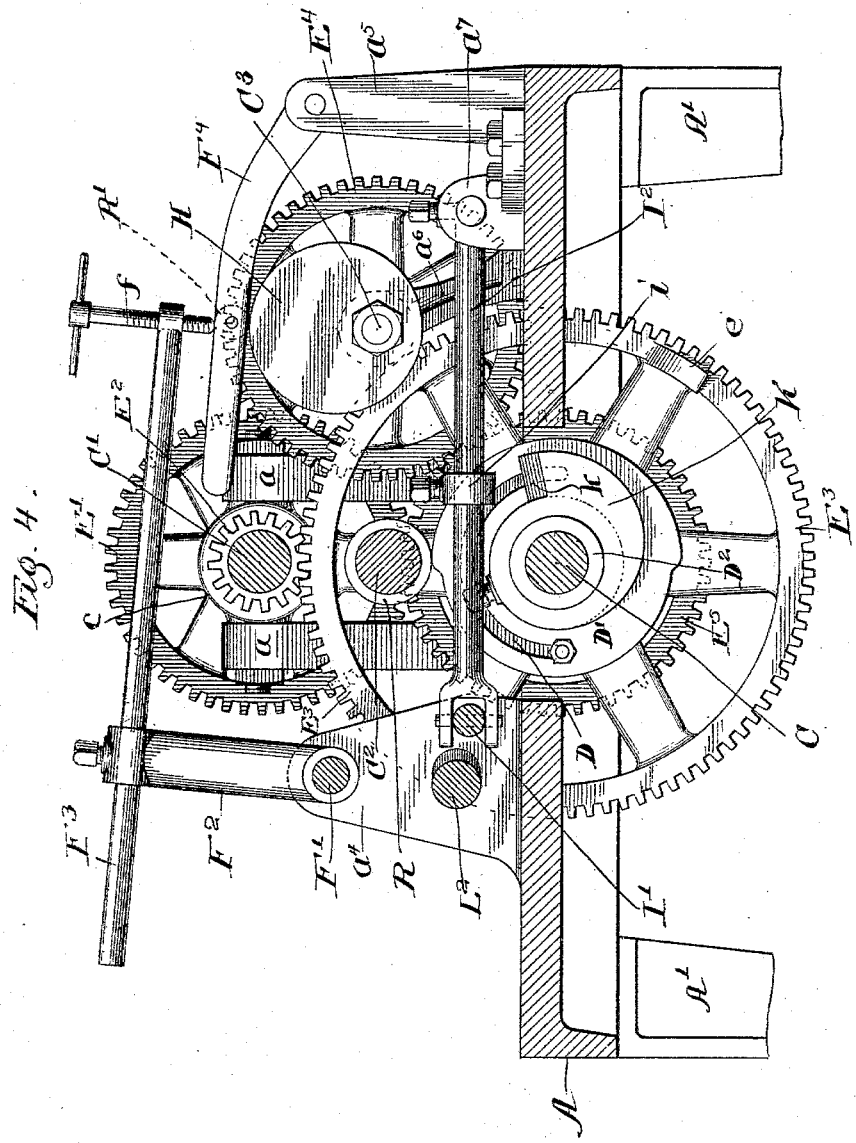

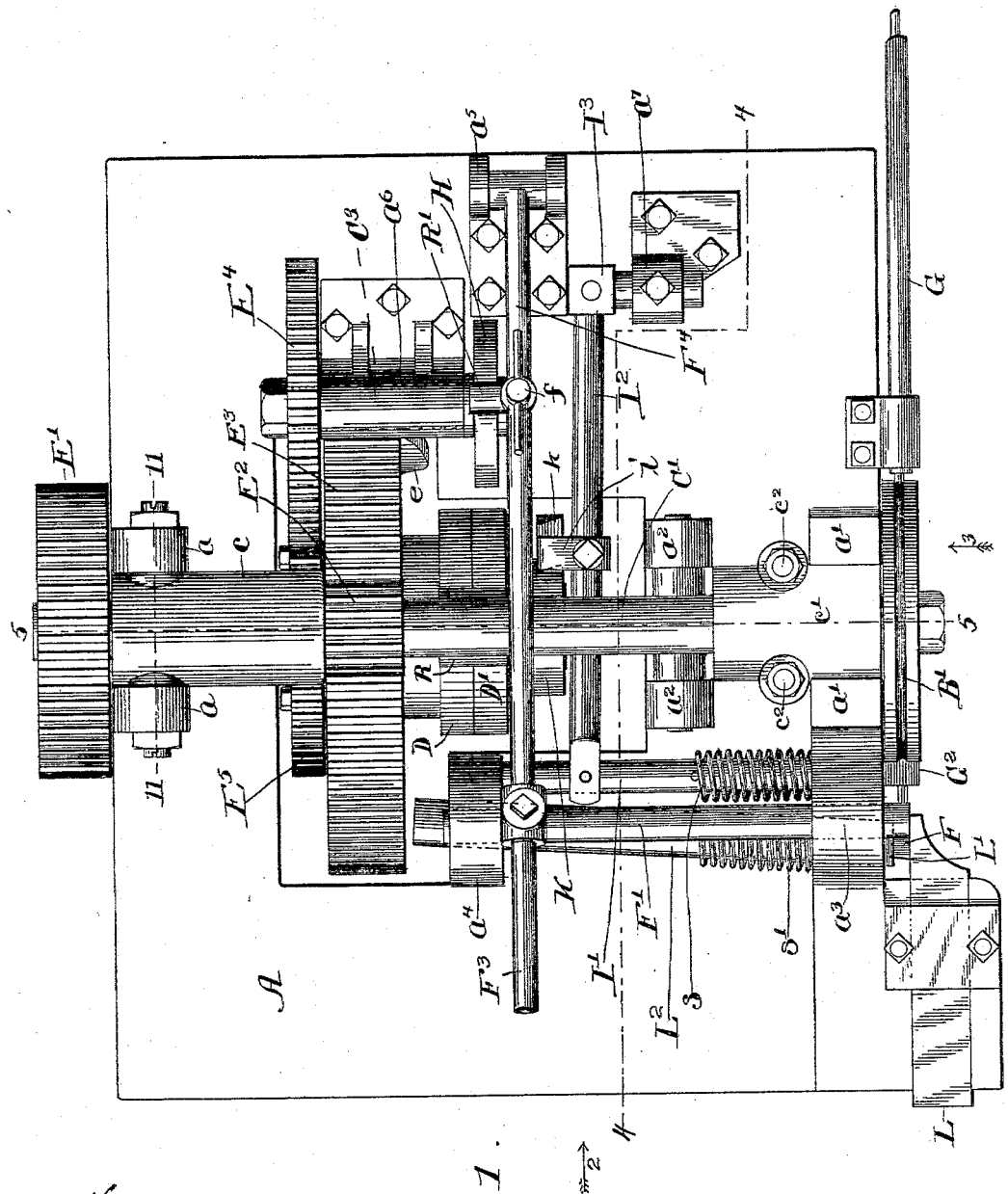

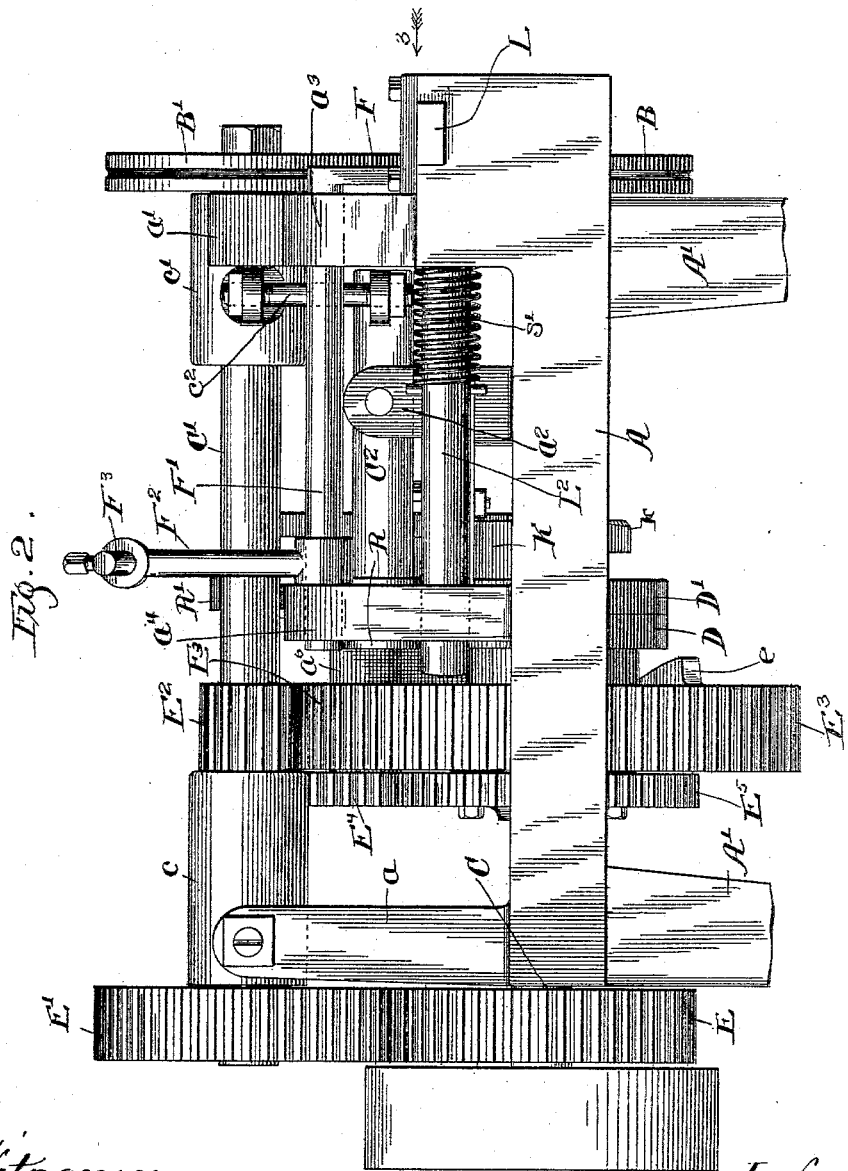

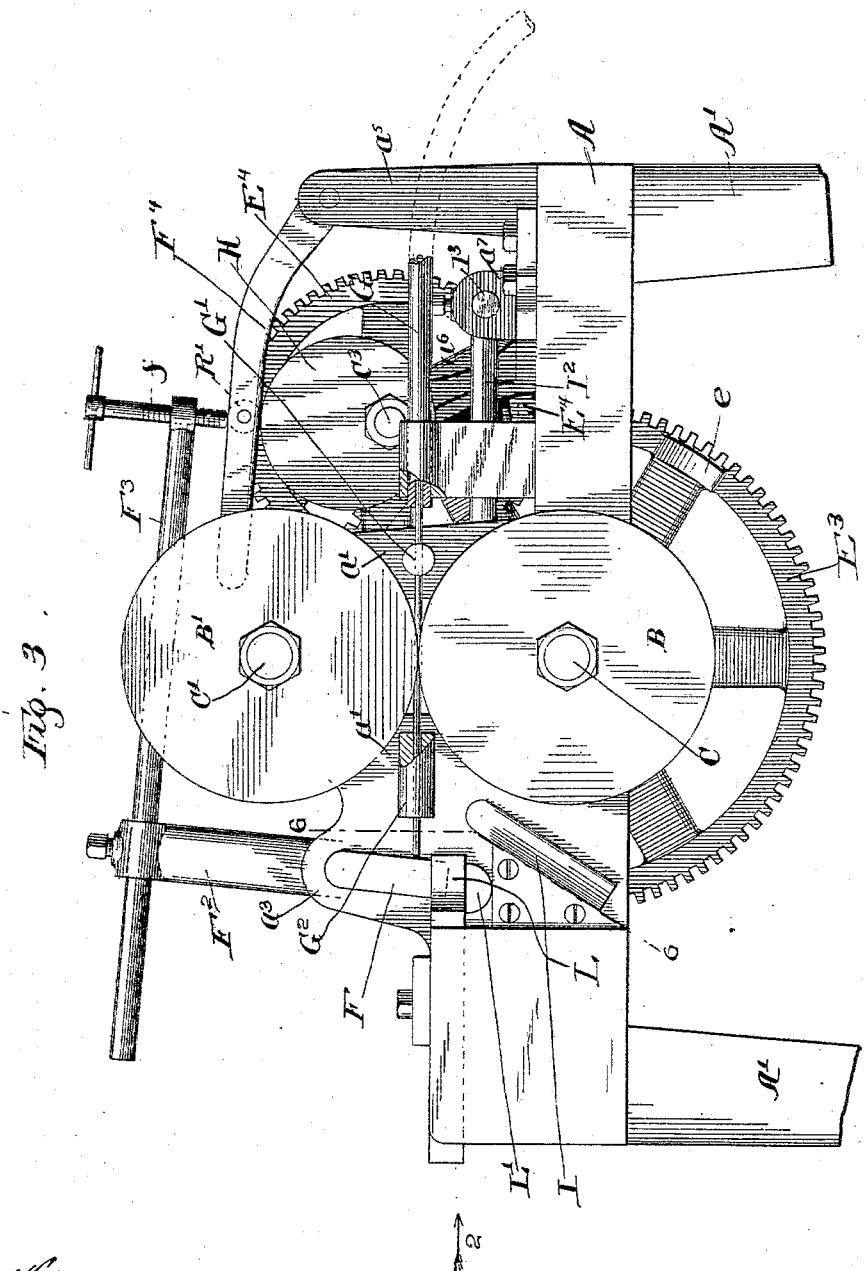

(No Model.)  6 Sheets—Sheet 5.
F. W. & A. G. HOEFER.
SPRING COILING MACHINE.
No. 598,094. Patented Feb. 1, 1898.
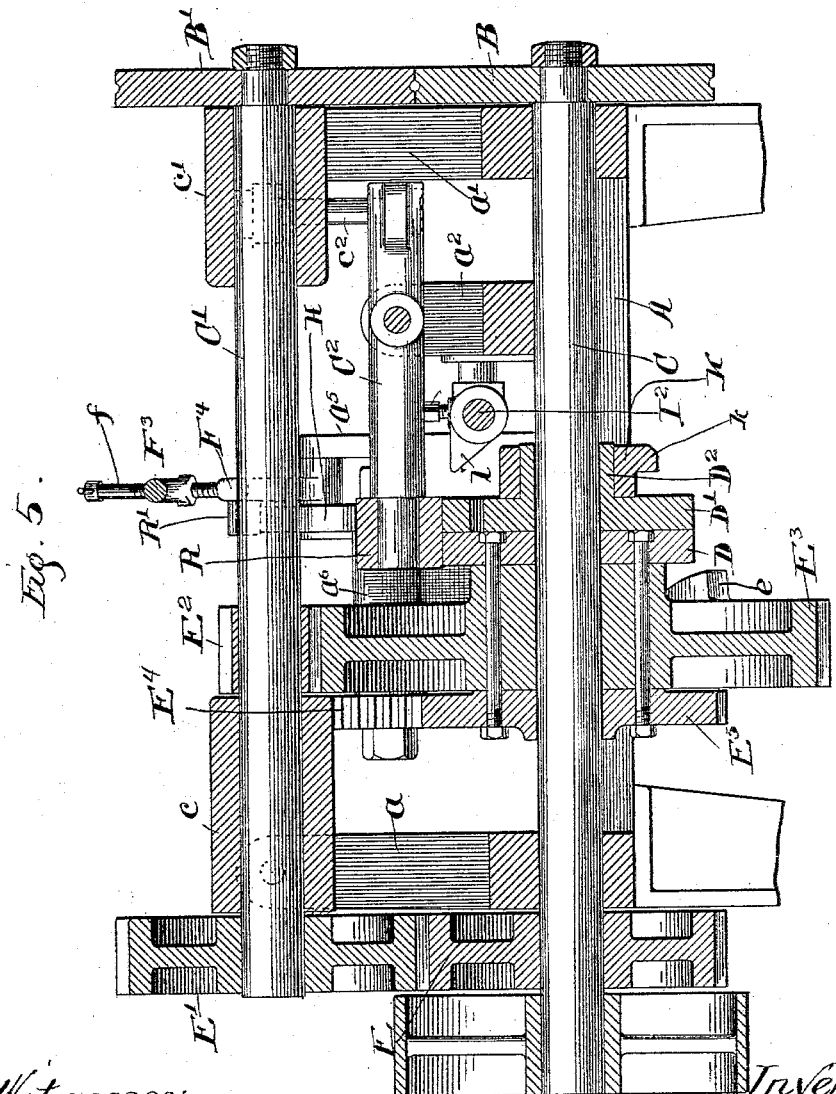
Witnesses:
Chas. O. Shervey.
A. H. Nelson
Inventors:
Frederick W. Hoefer and
August G. Hoefer
by Wiles, Mrue & Bitner
Their Attys.

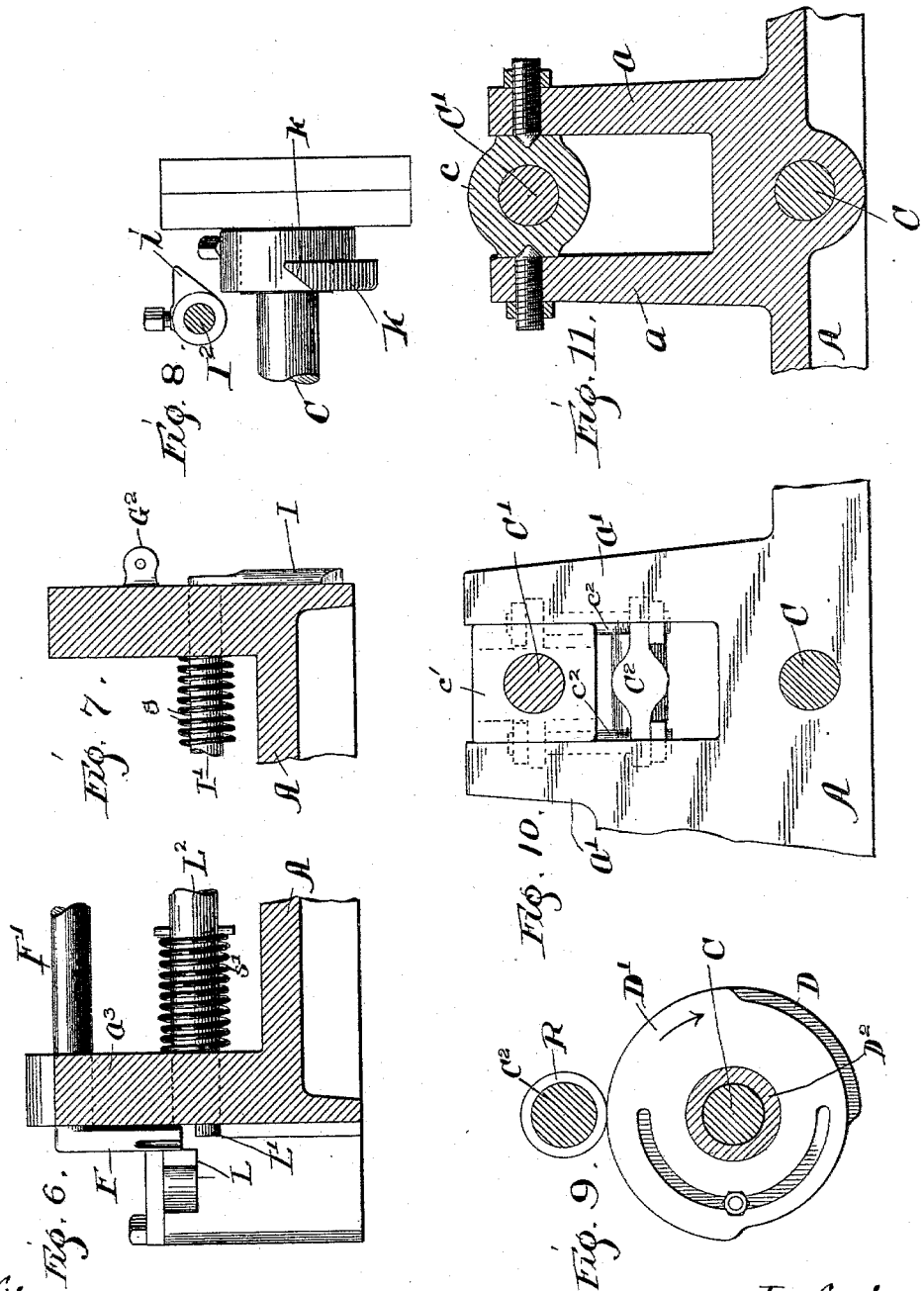

UNITED STATES PATENT OFFICE.

FREDERICK W. HOEFER AND AUGUST G. HOEFER, OF FREEPORT, ILLINOIS, ASSIGNORS TO THE STOVER NOVELTY WORKS, OF SAME PLACE.

SPRING-COILING MACHINE.

SPECIFICATION forming part of Letters Patent No. 598,094, dated February 1, 1898.

Application filed August 20, 1897. Serial No. 648,911. (No model.)

*To all whom it may concern:*

Be it known that we, FREDERICK W. HOEFER and AUGUST G. HOEFER, citizens of the United States of America, residing at Freeport, in the county of Stephenson and State of Illinois, have invented certain new and useful Improvements in Spring-Coiling Machines, of which the following is a specification.

Our invention relates to improvements in spring-coiling machines of the class especially adapted for coiling single or double coned wire springs such as are commonly used in spring-beds and upholstered furniture.

The object of the invention is to construct a compact and simple machine provided with certain adjustments whereby the same machine may be adapted to form either single or double coned springs of any desired length, diameter, and pitch within certain predetermined limits.

The invention is fully described and explained in this specification and shown in the accompanying drawings, in which—

Figure 1 is a top plan of a machine embodying our improvements. Fig. 2 is a side elevation, the view being in the direction indicated by the arrow 2 in Fig. 1 or Fig. 3. Fig. 3 is a front elevation of the machine, the view being in the direction indicated by the arrow 3 in Fig. 1 or Fig. 2. Fig. 4 is a transverse vertical section through the broken line 4 4, Fig. 1, the rear portion of the machine being shown in front elevation and the view being in the same direction as in Fig. 3. Fig. 5 is a longitudinal vertical section through the line 5 5, Fig. 1, the view being in the same direction as in Fig. 2. Fig. 6 is a partial vertical section through the line 6 6, Fig. 3, showing the knives and deflector in side elevation. Fig. 7 is a partial vertical section of the frame, showing the wire-guide and coil-spacer in side elevation. Fig. 8 is a detail view of the lever and cam for operating the coil-spacer. Fig. 9 is a front elevation of the feed-controlling cams and the roller actuated thereby. Fig. 10 is a front elevation of the vertically-sliding box at the front end of the upper feed-roll shaft, together with means for raising and lowering said box; and Fig. 11 is a transverse vertical section through the line 11 11, Fig. 1, showing the mounting of the rear end of the vertically-oscillating upper feed-roll shaft.

In the views, A is an approximately rectangular bed preferably supported by suitable legs A', the bed being of such proportions and weight as to form a substantial support for the working parts of the machine and being cut away or recessed as may be required to make room for any of said working parts. Supported on this bed are means for intermittently feeding wire from a coil, means for regulating the feed so as to force forward any desired length of wire during each complete cycle of the operation of the machine, means for deflecting the wire from its normal path, so as to form it into curves of any desired radius, means for so varying the position of the deflector as to vary the diameters of the successive curves in any desired way, means for forcing the rings or spirals thus formed from their normal plane of formation, thereby giving any desired pitch to the coils of the spring, and means for severing the wire at the close of each cycle of operation of the machine, and thereby cutting off the completed spring. All these mechanisms are extremely simple, not only taken separately, but when combined to operate together, as will be seen from the following detailed description of all the parts of the machine.

The feeding of the wire to the coiling devices is effected by means of two grooved feed-rolls B B' at the front of the machine, the lower feed-roll being mounted on the stationary main shaft C of the machine, and the upper feed-roll being mounted on the front end of a shaft C' above the shaft C, the shaft C' being normally parallel with the shaft C, but being so mounted as to have a slight movement of oscillation, whereby its front end may be sufficiently raised to clear the feed-roll B' from the wire and thus interrupt the feeding of the wire to the coiling devices. The shaft C' is mounted in two boxes $c$ and $c'$ at its rear and front ends, respectively, the box $c$ being pivoted between two vertical supports $a\ a$, as clearly shown in Fig. 11, and the box $c'$ being free to slide vertically between two supports $a'\ a'$, as shown in Fig. 10, and being connected by means of bolts $c^2$ with the front end of a vertically-oscillating shaft $C^2$, pivoted between its ends in supports $a^3$ on the frame and having on its rear end a roller R, which rests upon and is governed by two cams D D', Fig. 9, mounted loosely on the main shaft C and rotating independently of said shaft. The periphery of each of the cams D D' is of varying radius, a portion of the periphery being of such radius that when in contact with the roller R it raises it sufficiently to depress the front end of the shaft $C^2$ and the front end of the shaft C', so as to press the feed-roll B' upon the wire, and the remainder of the periphery being of such radius as to permit the roller R to drop down sufficiently to raise the feed-roll B' out of contact with the wire. The main shaft C, which is provided with a band-wheel or other means for its rotation, is provided near its rear end with a rigidly-mounted gear-wheel E, which engages a similar gear-wheel E' on the rear end of the shaft C'. The shaft C' is provided with a rigidly-mounted pinion $e^2$, engaging a large gear $E^3$, loosely mounted on the main shaft, the relative diameters of the pinion $E^2$ and gear $E^3$ being such as to give the gear $E^3$ one complete rotation for any predetermined number of rotations of the main shaft and feed-rolls and one rotation of the gear $E^3$ being coincident with a complete cycle of operation of the machine. The cam D is fastened rigidly to the gear $E^3$ and rotates in unison therewith, and the other cam D' is in operation rigidly fastened to the cam D, but is adjustable thereon in order to vary the time during which the feed-rolls shall actuate the wire in each complete cycle of the machine.

It is evident that if the cam D' be adjusted with relation to the cam D by moving it in the direction indicated by the arrow on the cam D' in Fig. 9 until the portions of the two cams of greatest radius exactly coincide the space of time during which the roller R will be raised so as to force the upper feed-roll into operative position will be less than when the two cams are in the relation shown in Fig. 9, and, on the other hand, if the cam D' be adjusted in the opposite direction the feeding time may evidently be increased, as desired. The cams may thus be adjusted until the feed-rolls will be made operative through the entire cycle of operation of the machine, with the exception of sufficient time for the cutting of the wire after the completion of a spring, or they may be so adjusted as to make the feed-rolls operate through only one-half the complete cycle of the machine. It is evident that by using more than two cams the percentage of time in which the feed-rolls shall operate may be still further decreased; but the variation provided for by the use of two cams will ordinarily be sufficient for all practical purposes.

It will be seen that by means of the feeding mechanism thus described the amount of wire to be fed forward during each cycle of operation of the machine may be accurately fixed, and this is evidently the first requirement in the construction of a machine intended to make automatically springs of different lengths. The next requirement is that the wire as fed forward may be formed into successive coils whose diameters may vary as desired, and this requirement is met by the mechanism which we shall now describe.

The wire from which the springs are to be made is brought to the feed-rolls by means of suitable guides G G' and passes from the feed-rolls through a third guide $G^2$, all these guides being suitably located and of suitable shape and diameter to perform their function. From the guide $G^2$ the wire is forced forward against a deflector F, formed on the front end of a shaft F', which is mounted in suitable supports $a^3$ $a^4$ on the frame of the machine and is free to oscillate therein, and thereby vary the distance from the guide $G^2$ of the oscillating deflector F. It is a well-known fact that if a wire of uniform quality be forced through a suitable guide against a stationary deflector arranged substantially like the deflector F the wire will be bent into a uniform curve of which the radius will be in a general way proportional to the distance of the deflector from the guide, and we have applied this principle to this machine by combining the deflector with an oscillating support and means for actuating the support, so as to vary the distance of the deflector from the wire-guide in a predetermined way, and thereby give to the successive coils formed by the machine a predetermined variation of radius.

In order to give to the shaft F' the desired oscillation, it is formed with an arm $F^2$, which supports a lever $F^3$, having in its free end a set-screw $f$, which rests upon an oscillating lever $F^4$, pivoted at its outer end in a support $a^5$, attached to the bed of the machine. The lever $F^4$ about midway of its length is provided with a roller R', which rests upon a cam H, mounted on the front end of a shaft $C^3$, which is journaled in a support $a^6$, fastened to the bed of the machine. On the rear end of the shaft $C^3$ is rigidly mounted a gear-wheel $E^4$, engaging a similar gear $E^5$, which is rigidly fastened to the rear face of the large gear-wheel $E^3$. The gears $E^4$ $E^5$ being alike, the cam H evidently makes one rotation for each rotation of the gear-wheel—that is, one rotation during each complete cycle of the operation of the machine. It is evident that with the rotation of the cam or eccentric H the lever $F^4$ must alternately rise and fall, thereby raising and lowering the set-screw $f$ and the end of the lever $F^3$, and thus oscillating the shaft F' and deflector F, the deflector being nearest the wire-guide $G^2$ when the free end of the lever $F^3$ is in its highest position. The shape of the cam H may of course be varied to give any desired throw to the free end of the lever $F^3$ and to make the rise and fall of the lever either uniform in rate or variable. Furthermore, the longitudinal adjustability of the lever $F^3$ permits contact of the set-screw $f$ with the lever $F^4$ at any desired distance from the pivot of the last-named lever, and the eccentricity of the cam may thus be multiplied or diminished in its effect by changing the distance of the point of support of the set-screw $f$ from the pivot of the lever on which it rests. It is evident that through the operation of the cam H the position of the deflector F with relation to the wire-guide $G^2$ may be perfectly controlled and the variation of radius of the successive coils of a spring be thereby fixed with perfect certainty. Not only is this true, but the cam is made angularly adjustable—i. e., adjustable in its own plane upon the shaft $C^3$—and it may thus be set with reference to the feed of the machine, so as to time the movements of the deflector in any desired relation to the feed of the wire. Thus if the cam be in the position shown in Fig. 4 at the instant the feed of the wire begins the free end of the lever $F^3$ will drop and the deflector will move away from the wire-guide as the feed continues. In that case the first coil of the spring will be the smallest and the remaining coils will successively increase in diameter, thus forming a single-cone spring of which the smaller end is made first and the larger end or base is made last. If, however, the cam be so placed that the roller $R'$ during the feed of the wire moves along a given arc of the periphery of the cam H, the point of greatest eccentricity of the cam being at the center of this path of movement, then the first and last coils of the spring will be the largest and the center coil the smallest of the coils of the spring, and the spring thus formed will be a double cone, largest at the ends and smallest at the center.

It is desirable that a single or double cone furniture-spring shall have its end coils flat or plane, while all the intermediate coils are separated by suitable spaces giving the spring the desired pitch. In order to adapt our invention to form springs in accordance with this requirement, we have provided a spacer so arranged as to operate when desired for the purpose of spacing the coils, but to be inoperative when it is desired to form a flat or plane end coil. This spacer is an arm I, formed on the end of a horizontal shaft $I'$ and extending obliquely downward immediately in front of the bed of the machine, the shaft $I'$ being mounted loosely in the same supports as the shaft $F'$ and being held normally at its rearward limit of motion by a coiled spring $s$. The normal position of the spacer I is such as to permit a coil formed by the deflector F to assume a position approximately in the vertical plane of the wire as it passes through the wire-guides $G'$ $G^2$, the coil thus formed being therefore a plane curve. The shaft $I'$ is, however, pivoted to the free end of a horizontally-oscillating lever $I^2$, whose opposite end is pivoted in an adjustable block $I^3$, mounted in a support $a^7$, fastened to the bed of the machine. This block is adjusted longitudinally in the support $a^7$ and held in adjustment by a set-screw, as shown. On the lever $I^2$ is mounted an adjustable inclined lug $i$, adapted to be struck by the lip $k$ of a cam K, Figs. 1, 4, 5, and 8, and forced toward the front of the machine, thereby pushing the shaft $I'$ and spacer I forward and forcing each coil as formed out of its normal vertical plane and into an inclined position, and thereby giving the necessary pitch to any desired number of the coils. At a suitable time before the completion of the last coil of the spring the spacer is permitted to drop back in order that the last coil may be flat. The cam K is rectangularly adjustable on a hub $D^2$, formed on the front face of the cam $D'$, and it thus rotates once for each rotation of the cam $D'$ and gear-wheel $E^3$—that is, once during each cycle of movement of the machine. The cam K, like the cam H, may be so adjusted as to time it in any desired manner with relation to the feed of the wire, in order that it may operate to push the spacer forward at the proper instant, and, furthermore, the time during which the cam shall hold the spacer in its advanced operative position may be varied by adjusting the lug $i$ on the lever $I^2$. The cam K, as clearly shown in Fig. 4, is eccentric, and the lug $i$ may be so adjusted as to make contact with the lip $k$ at a greater or less distance from the axis of the shaft C. The farther the lug is from the axis of the shaft the shorter will be the relative space of time during which it is in contact with the face of the cam K and the shorter will be the time during which the spacer is held in its advanced and operative position. The space between the coils and the pitch of the spring may be varied by adjusting the block $I^3$ with relation to the support $a^7$. The farther the block $I^3$ is from its support the greater will be the throw of the free end of the lever $I^2$, and consequently the greater will be the space between the successive coils.

In forming double-cone springs it is sometimes desirable to make the small coils at the middle of the spring close together—that is, without any spaces between them—and to effect this the spacer may be cut back at its upper end, as shown in Fig. 7, so that a coil of small diameter lying in front of the part of the spacer so cut back may be formed practically in the vertical plane of the wire, any number of successive coils of the same small diameter being thus formed in close contact with each other. This same result might of course be effected by allowing the spacer to drop back while the central coils were formed and then pressing it forward again to space the larger coils; but it is much simpler to cut back the upper end of the spacer, as shown and described.

After the formation of the last coil of a spring the upper feed-roll is raised out of engagement with the wire, the feed ceases, and the wire remains stationary at least a sufficient time for the operation of cutting-knives which separate the spring from the body of the wire. The cutting mechanism in our machine comprises two knives, one a stationary knife L, secured in a transverse groove in the upper face of the front portion of the bed, and the other being a knife L', formed on the front end of a longitudinally-sliding bar L², supported in suitable guides on the bed of the machine and held normally out of working position by a spring s', which forces it backward. The upper edge of the knife L' is immediately below the lower edge of the knife L, the two edges being adapted to form a shear when the bar L² is pressed forward. The main gear E³ is formed with a beveled lug e, Figs. 1, 3, and 4, adapted to impinge upon the rear end of the bar L² at the proper moment, thereby pressing the bar and the knife L' forward and severing the wire, which in its formation into coils passes in front of the knife L' and behind the knife L. The forcing forward of the knife L' is the end of the cycle of operation of the machine, and immediately after the severing of the coil a new operation of the machine begins and a new spring is formed through the operation of the parts timed and adjusted, as above described, so as to produce the desired result.

As the parts of the machine are shown in the drawings, and most clearly in Fig. 4, they are adapted to form a single-cone spring, beginning with the smallest coil at one end of the spring and ending with the largest coil at the base of the spring. One half the cycle of rotation of the machine has been finished and the second half is about to begin. The knife-actuating lug e is one hundred and eighty degrees from the sliding knife-bar L². The cams D D', which throw the upper feed-roll into engagement, have just forced the roller R upward to effect such engagement. The cam H has its point of greatest eccentricity in contact with the roller R' on the lever F⁴, so that the deflector is in the position nearest the wire-guide G², and the lip k of the cam K is at such distance from the lug i as to give time for the formation of a plain end coil before throwing forward the spacer. The remaining half of the cycle of operation of the machine, continuing from the position of the parts shown in Fig. 4, will evidently form a single-cone spring, beginning at the smaller end of the cone, ending at the larger end, and severing the spring from the coil.

Having now described and explained our invention, what we claim as new, and desire to secure by Letters Patent, is—

1. In a spring-coiling machine, the combination with continuously-rotating coacting feed-rolls so mounted that they may be forced together or apart, of an adjustable cam suitably mounted in the machine and actuated by the driving mechanism thereof, connecting devices between the cam and the feed-rolls whereby said cam may force said feed-rolls together, and a deflector supported in the path of the wire and adapted to bend the same into a coil; substantially as described.

2. In a spring-coiling machine, a reciprocating deflector adapted to move toward or from the nearest support of the wire, a moving cam, and adjustable connecting devices between the cam and the reciprocating deflector adapted by their adjustment to increase or diminish the throw of the deflector; substantially as described.

3. The combination with a continuously-rotating fixed shaft, C, and the feed-roll, B, mounted thereon, of the continuously-rotating shaft, C', the feed-roll, B', mounted thereon and adapted to coact with the feed-roll, B, the oscillating box, c, supporting one end of said shaft, the sliding box, c', supporting the opposite end of said shaft, the cams, D, D', means substantially as shown and described whereby said cams may periodically actuate the box, c', and draw the feed-roll, B', toward the feed-roll, B, thereby adapting the feed-rolls to force forward a wire, and a deflector supported in the path of movement of the wire from the feed-rolls and adapted to bend the wire into a predetermined curve.

4. In a spring-coiling machine, the shaft, C, and feed-roll, B, the shaft, C', and feed-roll, B', the boxes, c, c', the cams, D, D', formed substantially as shown and described, and the oscillating shaft, C², connected at one end with the box, c', and provided at the other end with a roller, R, in contact with the periphery of the compound cam, D, D', whereby the feed-roll, B', may be periodically pressed toward the feed-roll, B, to adapt the feed-rolls to force forward a wire, in combination with a deflector supported in the path of the wire forced forward from the feed-rolls and adapted to form the wire into a predetermined curve.

5. In a spring-coiling machine, the combination with automatically-controlled feed-rolls adapted to intermittently force forward a wire, of a deflector supported in the path of the wire forced forward from the rolls and adapted to curve the wire, and a cam adjustably mounted upon a rotating shaft and having suitable connections with the deflector to move the latter toward or from the wire to vary the size of the coil; substantially as described.

6. In a spring-coiling machine, the combination with coacting feed-rolls adapted to force forward a wire, of a deflector mounted on an oscillating shaft and thereby supported in the path of movement of the wire from the feed-rolls, and means for imparting to the shaft a predetermined oscillation and thereby varying the distance of the deflector from the nearest stationary support of the wire, the deflector being adapted to form the wire into a curve and the oscillation of the shaft being adapted to give to the radius of the curve a predetermined variation.

7. In a spring-coiling machine, the combination with coacting feed-rolls adapted to force forward a wire, of an oscillating shaft, a deflector mounted on said shaft in the line of movement of the wire from the feed-rolls, a lever attached to said shaft and adapted by its movement to oscillate the same, and a rotating cam adapted to operate said lever, thereby oscillating said shaft and varying the distance of the deflector from the nearest point of support of the wire, the deflector being adapted to form the wire into a curve and the oscillation of the shaft by the cam and lever being adapted to give to the curve of the wire a predetermined variation.

8. In a spring-coiling machine, the combination with coacting feed-rolls adapted to force forward a wire, of an oscillating shaft, a deflector mounted on said shaft in the path of movement of the wire from the feed-rolls, a longitudinally-adjustable lever fastened to said shaft and adapted by its movement to oscillate the same, a second lever pivoted in a suitable support and supporting the free end of the lever attached to said oscillating shaft and a rotating cam supporting said second pivoted lever and adapted to swing the same on its pivot, the deflector being adapted to bend the wire from the feed-rolls into a curve, the rotation of said cam being adapted to oscillate said levers and said shaft and thereby vary the distance of the deflector from the nearest point of support of the wire, and the longitudinal adjustability of the lever fastened to the oscillating shaft being adapted to vary the distance of its free end from the pivot of the lever which supports it and thereby vary the oscillation imparted to the shaft and deflector by the rotation of the cam.

9. In a spring-coiling machine, the combination with feed-rolls coacting periodically to force forward a wire, of an oscillating shaft, a deflector mounted on said shaft in the path of movement of the wire from the feed-rolls, an angularly-adjustable cam and means interposed between said cam and said oscillating shaft, whereby the rotation of the cam may oscillate the shaft, the deflector being adapted to form the wire in a curve, the oscillation of the shaft by the cam being adapted to vary the distance of the deflector from the nearest point of support of the wire and thereby vary the radius of the curve of the wire, and the angular adjustability of the cam being adapted to time its operation in any desired relation to the operation of the feed-rolls, whereby the variation of the curve of the wire may have any desired relation to the feed of the wire.

10. In a spring-coiling machine, the combination with coacting feed-rolls adapted to force forward a wire, of a deflector supported in the path of movement of the wire from the feed-rolls and adapted to form the wire into a curve, a spacer supported normally at one side of the plane of the curve formed in the wire by said deflector and means for forcing said spacer, at a predetermined time, into the path of the curved wire from the deflector, holding it in said path for a predetermined time and then permitting it to return to its normal position, the wire from the feed-rolls, when unaffected by said spacer, being formed into an approximately plane curve, and the spacer, when in the path of the curved wire, being adapted to deflect the same from its normal plane and thereby give to the successive coils formed in the wire a suitable pitch.

11. The combination with the feed-rolls and the oscillating deflector formed substantially as described, of a longitudinally-sliding shaft, a spacer mounted on said shaft and normally at one side of the plane of the coils formed in the wire by the deflector, an oscillating lever pivoted at one end to said sliding shaft, and a rotating cam adapted to actuate said oscillating lever, thereby actuating the shaft and moving the spacer into and holding it in the path of the curved wire from the deflector, the deflector being adapted to form the wire into successive coils, normally in close contact with each other, and the spacer when in the path of the coils being adapted to deflect the coils from their normal plane and thereby space them with relation to each other.

12. In a spring-coiling machine, the combination with the periodically-operating feed-rolls and oscillating deflector, of a longitudinally-sliding shaft, a spacer mounted on said shaft and normally at one side of the plane of the curves formed in the wire by the deflector, a lever adapted to actuate said sliding shaft and thereby project the spacer into and hold it in the path of the wire from the deflector and an angularly-adjustable cam adapted to actuate said lever and through it said sliding shaft and spacer, the angular adjustability of the cam being adapted to permit the timing of its operation with relation to the operation of the feed-rolls and of the deflector.

13. The combination with the feed-rolls, the deflector and the spacer, operating substantially as described, of an oscillating lever connected at one end with the spacer and pivoted to an adjustable support, and a cam impinging upon the lever and adapted to actuate it and through it the spacer, the adjustability of the support of the oscillating lever being adapted to vary the throw of the spacer, substantially as and for the purpose set forth.

14. The combination with the feed-rolls and the oscillating deflector adapted to form curves of varying radius in a wire forced forward by the feed-rolls, of a spacer supported normally at one side of the curves formed in the wire by the deflector, and means for forcing the spacer into the path of the curved wire from the deflector, substantially as shown and described, that portion of the face of the deflector nearest the common center of the curves of varying radius being cut back as compared with the remainder of the spacer, whereby the smaller curves may have less pitch than the larger curves formed in the wire.

15. The combination in a spring-coiling machine, of feed-rolls having any predetermined number of rotations during each complete cycle of the operation of the machine, a deflector adapted to form the wire from the feed-rolls into curves of predetermined radius, a spacer adapted to press the coils formed by the deflector, from their normal plane, cams operating said deflector and spacer, respectively, and each rotating once for each complete cycle of the operation of the machine, a stationary knife and a movable knife between which the wire passes from the deflector and means for actuating said movable knife, approximately at the close of each complete cycle of operation of the machine and thereby severing the wire.

In witness whereof we have hereunto set our hands, at Freeport, in the county of Stephenson and State of Illinois, this 14th day of August, A. D. 1897.

FREDERICK W. HOEFER.
    AUGUST G. HOEFER.

Witnesses:
 W. A. MERRIFIELD,
 L. HUGHES.